No. 815,372. PATENTED MAR. 20, 1906.
N. F. PALMER.
MACHINE FOR MOLDING ARTIFICIAL STONE.
APPLICATION FILED NOV. 7, 1905.
2 SHEETS—SHEET 1.
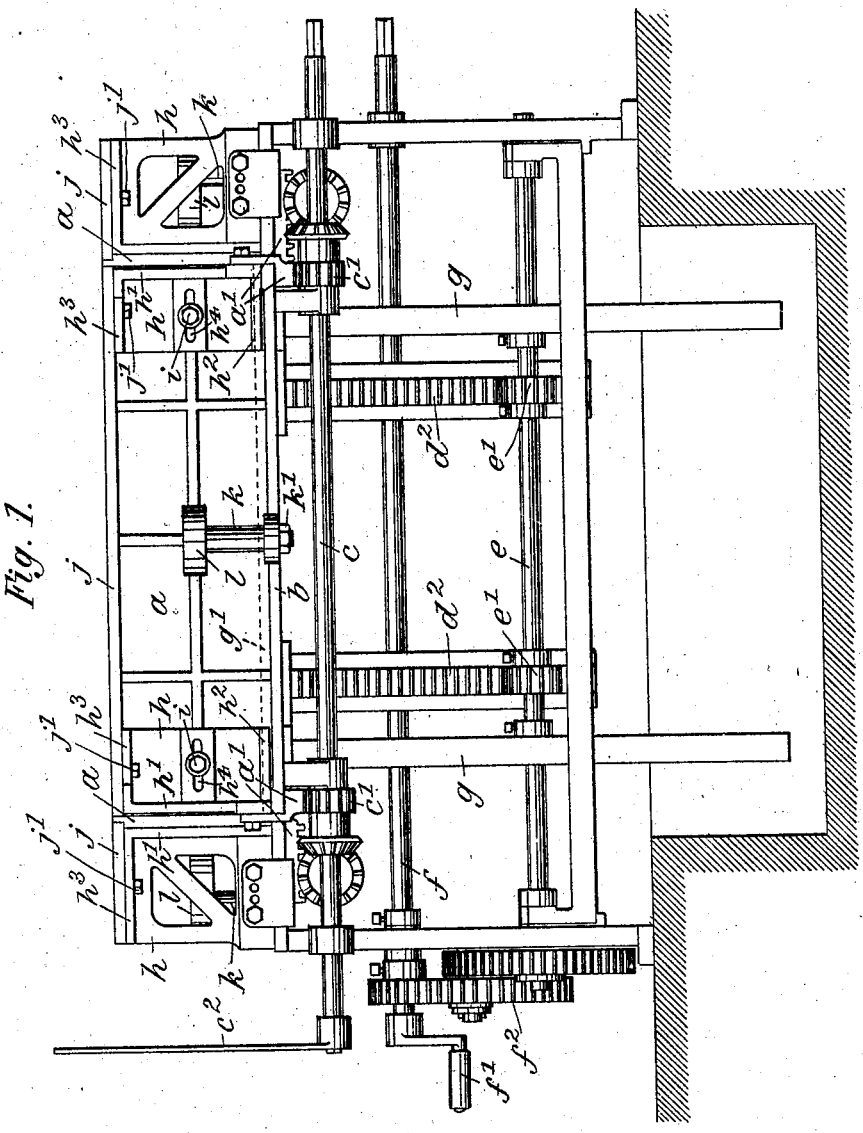
Witnesses:
Arthur Gumpe.
William Schulz
Inventor:
Noyes F. Palmer
by Frank v. Briesen Atty.

No. 815,372. PATENTED MAR. 20, 1906.
N. F. PALMER.
MACHINE FOR MOLDING ARTIFICIAL STONE.
APPLICATION FILED NOV. 7, 1905.
2 SHEETS—SHEET 2.
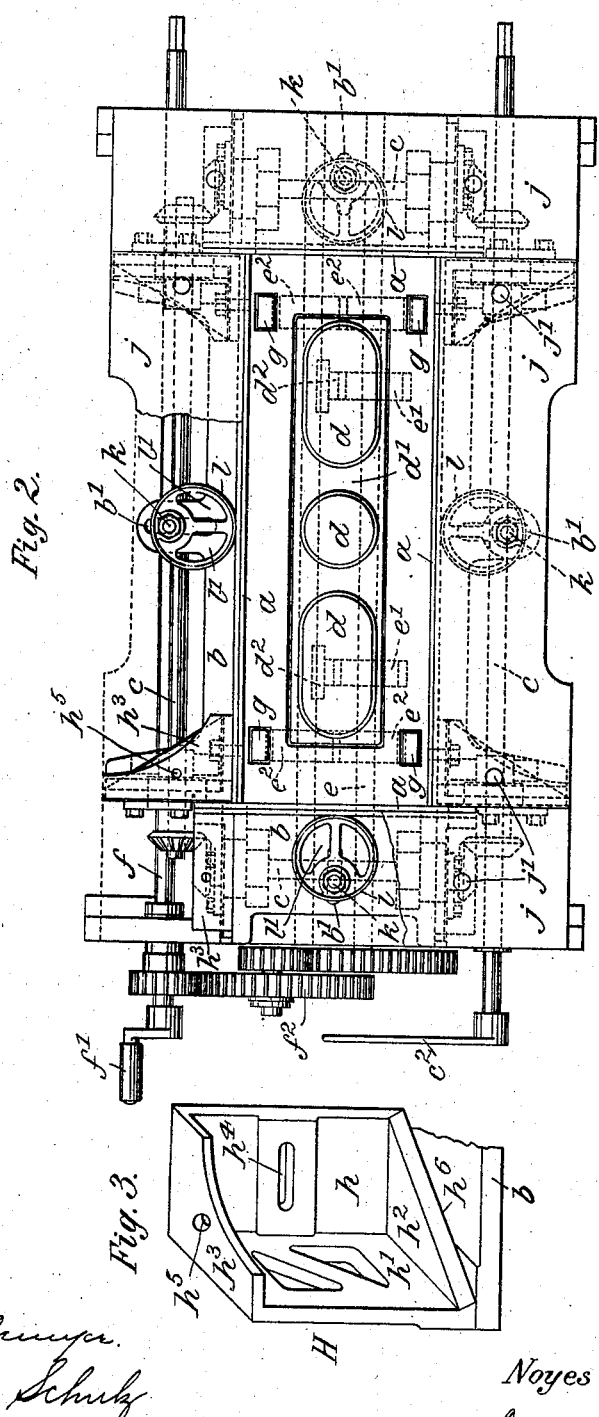
Witnesses:
Inventor:
Noyes F. Palmer,
by
Att'y.

UNITED STATES PATENT OFFICE.

NOYES F. PALMER, OF NEW YORK, N. Y.

MACHINE FOR MOLDING ARTIFICIAL STONE.

No. 815,372.

Specification of Letters Patent.

Patented March 20, 1906.

Application filed November 7, 1905. Serial No. 286,196.

*To all whom it may concern:*

Be it known that I, NOYES F. PALMER, a citizen of the United States, residing at New York city, Brooklyn, county of Kings, State of New York, have invented new and useful Improvements in Machines for Molding Artificial Stone, of which the following is a specification.

This invention relates to an improved machine for molding artificial stone, and more particularly to means for protecting the machine against any cement that may be spilled around the mold, and also to means for reinforcing the mold.

In the accompanying drawings, Figure 1 is a side elevation of my improved machine for molding artificial stone; Fig. 2, a plan thereof with the false bottom omitted, and Fig. 3 is a detail of one of the brackets.

The machine comprises a mold having four sides $a$, which are slidable upon a bottom plate $b$, that projects beyond such sides. The mold is opened or closed by means of four intergeared shafts $c$, which are operatively connected with sides $a$ by racks $a'$ and pinions $c'$. Thus by turning a handle $c^2$ on one of the shafts $c$ the sides $a$ will be simultaneously moved inward or outward.

Within the mold are inclosed a series of cores $d$, mounted upon a core-plate $d'$, having downwardly-extending racks $d^2$. These racks are engaged by pinions $e'$ of a countershaft $e$, which is intergeared with a shaft $f$, having handle $f'$, by a train of gearing $f^2$. The shaft $e$ is likewise intergeared by wheels $e^2$ with a set of toothed lifters $g$, that are adapted to engage a false bottom $g'$, resting upon bottom plate $b$. By manipulating handle $f'$ the cores $d$ will be lowered, while the green stone supported upon false bottom $g'$ will be simultaneously raised, all substantially as described in Patent No. 700,551, issued to me May 20, 1902.

To each of the sides $a$ there is secured at each end an outwardly-extending bracket H, Fig. 3, projecting over bed-plate $b$. Bracket H is preferably composed of two upright sides $h$ $h'$, a bottom plate $h^2$, and a top plate $h^3$. The side $h$ has a horizontal slot $h^4$, engaged by a bolt $i$, that connects the bracket adjustably to side $a$. The two top plates $h^3$ of each pair of brackets H support a guard or shelf $j$, secured to such brackets by bolts $j'$, passing through openings $h^5$ of the top plates. The surface of each guard $j$ is flush with the upper edge of its side $a$ and forms a horizontal outward extension of such side, Fig. 1. These guards $j$ have for their object to protect the machine from any cement that may be spilled around the mold while the latter is charged or while the cement is tamped or stuck off, so that clogging is prevented and clean working is insured. The edge bottom plate $h^2$ is beveled or sharpened to constitute a scraper $h^6$, which sweeps all particles of cement off base-plate $b$ around sides $a$ as the mold is being opened.

In order to lock the sides $a$ and prevent them from bulging outward during the tamping operation, I have devised the following construction: The bed-plate $b$ is provided opposite the outer side of each of the sides $a$ with a slot $b'$, extending at right angles to such side. This slot receives the lower end of a post or pivot $k$, adjustably secured thereto by nut $k'$. Upon post $k$ turns an oval cam $l$, which when swung inward will engage side $a$ at its center and securely lock the same against bulging during the tamping operation. When the mold is to be opened the cams are rotated by handholds $l'$ to release sides $a$ and permit them to be spread by turning handle $c^2$. In this way the machine is reinforced in such a manner that all stones will turn out true and uniform.

What I claim is—

1. In a machine for molding artificial stone, a mold having slidable sides, combined with a pair of brackets each having two upright sides, a top plate and a bottom plate, means for securing said brackets to one of the mold sides, and a shelf supported upon the brackets, substantially as specified.

2. In a machine for molding artificial stone, a mold having slidable sides and a bottom plate projecting beyond such sides, combined with brackets projecting outwardly from the sides and having a beveled lower edge, and with shelves supported on the brackets, substantially as specified.

3. In a machine for molding artificial stone, a mold having slidable sides and a slotted bottom plate projecting beyond such sides, combined with posts adjustably secured to the slotted bottom plate, and with cams that are rotatable on the posts and are adapted to engage the sides, substantially as specified.

Signed by me at New York city, (Manhattan,) New York, this 6th day of November, 1905.

NOYES F. PALMER.

Witnesses:
WILLIAM SCHULZ,
FRANK V. BRIESEN.